US006453734B1

(12) United States Patent
Tomikawa et al.

(10) Patent No.: US 6,453,734 B1
(45) Date of Patent: Sep. 24, 2002

(54) DIAGNOSIS FOR EGR SYSTEM

(75) Inventors: Saburo Tomikawa; Katsuhiko Kawamura; Osamu Matsuno, all of Kanagawa (JP)

(73) Assignee: Nissan Motor Co., LTD, Yokohama (JP)

( * ) Notice: Subject to any disclaimer, the term of this patent is extended or adjusted under 35 U.S.C. 154(b) by 0 days.

(21) Appl. No.: 09/290,885

(22) Filed: Apr. 14, 1999

(30) Foreign Application Priority Data

Apr. 28, 1998 (JP) .......................................... 10-118059

(51) Int. Cl.[7] .............................................. G01M 19/00
(52) U.S. Cl. ...................................................... 73/118.1
(58) Field of Search ............................ 73/117.2, 117.3, 73/118.1, 118.2, 116; 123/571, 568.16; 701/107, 108

(56) References Cited

U.S. PATENT DOCUMENTS

| | | | | | |
|---|---|---|---|---|---|
| 4,996,874 | A | * | 3/1991 | Colomer et al. | 73/118.1 |
| 5,137,004 | A | * | 8/1992 | Takahata et al. | 123/571 |
| 5,184,501 | A | * | 2/1993 | Lewis et al. | 73/23.31 |
| 5,440,921 | A | * | 8/1995 | Matsuno et al. | 73/117.3 |
| 5,703,285 | A | * | 12/1997 | Shimizu et al. | 73/118.1 |

FOREIGN PATENT DOCUMENTS

| | | |
|---|---|---|
| JP | 4-113244 | 4/1992 |
| JP | 5-5465 | 1/1993 |
| JP | 9-32625 | 2/1997 |

* cited by examiner

*Primary Examiner*—Benjamin R. Fuller
*Assistant Examiner*—Maurice Stevens
(74) *Attorney, Agent, or Firm*—Foley & Lardner

(57) ABSTRACT

An EGR system comprises a vacuum-operated EGR valve and an auxiliary valve of a diaphragm type for assisting the operation of the EGR valve. A diagnostic control unit monitors an engine rotational fluctuation parameter such as a misfire parameter under the condition of EGR and judges that there is a possibility of abnormality in the auxiliary valve when the fluctuation parameter is greater than a first judgment value. In response to this judgment, the diagnostic control unit forcibly cuts off the EGR and calculates the fluctuation parameter under the condition of EGR cutoff. The diagnostic control unit concludes that the auxiliary valve is abnormal when the fluctuation parameter in the EGR cutoff state is smaller than or equal to a second judgment value which is smaller than the first judgment value.

5 Claims, 4 Drawing Sheets

DIAGNOSIS FOR EGR SYSTEM

BACKGROUND OF THE INVENTION

The present invention relates to diagnostic technique for EGR systems for recirculating part of exhaust gases of an engine.

A Japanese Patent Kokai Publication No. 5(1993)-5465 shows a conventional diagnostic system for detecting an abnormal condition in an EGR system.

SUMMARY OF THE INVENTION

It is an object of the present invention to provide a diagnostic system or process for accurately identifying and locating a cause of malfunction in an EGR system.

According to the present invention, an EGR system comprises:

- an EGR valve varying an valve opening in accordance with an intake vacuum;
- an auxiliary valve assisting the EGR valve;
- a first parameter calculating section calculating an engine rotational fluctuation parameter in an EGR state in which an EGR operation is in progress;
- a first checking section making a first decision that there is a possibility of a malfunction in the auxiliary valve causing an excess of an EGR quantity when the fluctuation parameter is greater than a first judgement value;
- an EGR cutting section forcibly cutting off the EGR operation, irrespective of a condition for continuing the EGR operation, when the first decision is made;
- a second parameter calculating section calculating the engine rotational fluctuation parameter in an EGR cutoff state in which the EGR operation is cut off; and
- a second checking section making a second decision that there actually exists a malfunction in the auxiliary valve when the fluctuation parameter calculated by the second parameter calculating section is equal to or smaller than a second judgement value which is smaller than the first judgement value.

A diagnostic process according to the present invention comprises:

- calculating an engine rotational fluctuation parameter in an EGR state in which an EGR operation is in progress;
- making a first decision that there is a possibility of a malfunction in the auxiliary valve causing an excess of an EGR quantity when the fluctuation parameter is greater than a first judgement value;
- forcibly cutting off the EGR operation, irrespective of a condition for continuing the EGR operation, when the first decision is made;
- calculating the engine rotational fluctuation parameter in an EGR cutoff state in which the EGR operation is cut off; and
- making a second decision that there actually exists a malfunction in the auxiliary valve when the fluctuation parameter calculated in the EGR cutoff state is equal to or smaller than a second judgement value which is smaller than the first judgement value.

DETAILED DESCRIPTION OF THE INVENTION

Figure 1:
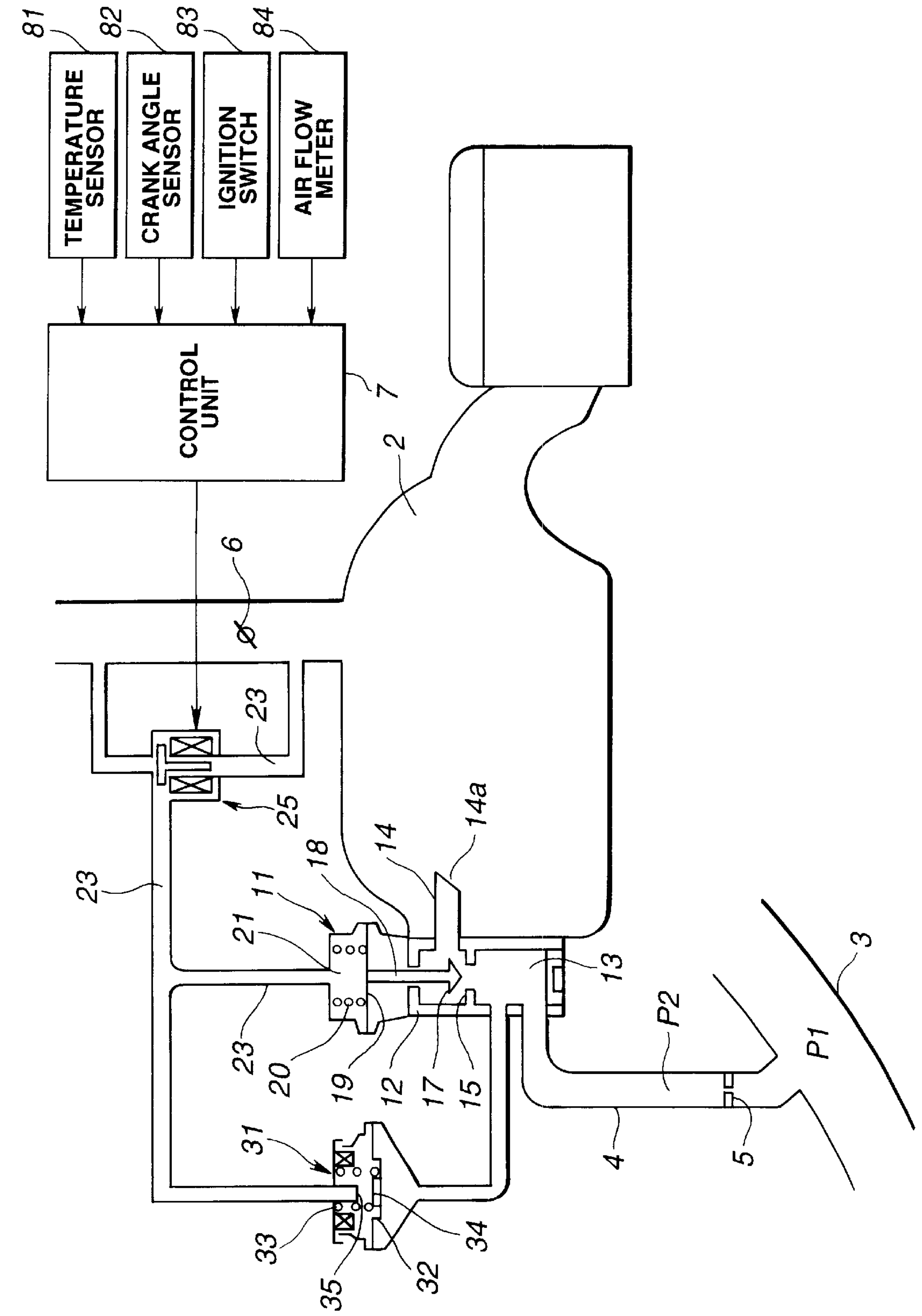
FIG. 1 is a schematic view showing an exhaust back pressure control type EGR system according to one embodiment of the present invention.

FIG. 1 shows an EGR system according to one embodiment of the present invention. The EGR system recirculates a metered amount of the exhaust gas mixture from an exhaust system to an intake system of an engine. The EGR system comprises, as main components, an EGR valve 11 and an auxiliary valve for assisting the EGR valve. The EGR system of FIG. 1 is a back pressure control type EGR system, and the auxiliary valve is a BPT valve (back pressure transducer valve) 31 (first valve).

The EGR valve 11 is attached to a collector section 2 of an intake pipe. A valve body 12 defines a gas passage 13. A first port is connected through an EGR passage 4 to an exhaust manifold 3. A second port is connected to an EGR introduction pipe 14 projecting into the collector section 2. A control orifice 5 is provided in the EGR passage 4, and designed to restrict the flow of exhaust gases through the EGR passage 4 to the EGR valve 11.

The EGR valve 11 comprises a valve seat 15 fit in the gas passage 12, and a valve element 17 resting on the valve seat 15 from above as viewed in FIG. 1. A valve shaft (or stem) 18 is integral with the valve element 17. The EGR valve 11 further comprises a diaphragm 19 to which the valve shaft 18 is fixed, and a valve spring 20 for normally holding the valve element 17 at a closed position at which the valve element 17 is seated on the valve seat 15. A vacuum chamber 21 is connected through a vacuum passage 23 to the intake passage section downstream of a throttle valve 6 for the engine. When the intake manifold vacuum (or intake vacuum or intake negative pressure) developed on the downstream side of the throttle valve 6 is introduced into the vacuum chamber 21 of the EGR valve 11 through the vacuum passage 23, the diaphragm 19 lifts up the valve element 17 against the force of the valve spring 20 to an open position.

An EGR control solenoid valve 25 is a three way selector valve for selectively introducing the atmospheric pressure or the intake vacuum into the vacuum chamber 21. The solenoid valve 25 introduces the atmospheric pressure on the upstream side of the throttle valve 6 into the vacuum chamber 21 when a solenoid control signal supplied from a control unit 7 is in an off state. When the control signal is in an on state, the solenoid valve 25 is switched to a position for introducing the intake vacuum into the vacuum chamber 21.

The BPT valve 31 is designed to control a control vacuum (or control negative pressure) supplied to the vacuum chamber 21 of the EGR valve 11 in a manner of feedback control so as to hold an exhaust back pressure P2 on the downstream side of the control orifice 5 constant. If the exhaust back pressure P2 increases, a diaphragm 32 of the BPT valve 31 is moved upwards as viewed in FIG. 1 against the force of a spring 33, and a seat 32 fixed to the diaphragm 34 decreases an opening size of a fluid passage formed between the seat 34 and an open end 35 confronting the seat 34, so that the rate (or proportion) of dilution of the intake vacuum with the atmosphere decreases, and hence the control vacuum introduced into the vacuum chamber 21 increases.

As a result, the valve element 17 of the EGR valve 11 further moves upwards and increases the opening degree of the EGR valve 11 to restrain the increase in the exhaust back pressure P2 downstream of the control orifice 5. Thus, the BPT valve 31 functions to control the exhaust back pressure P2 acting on the EGR valve 11 substantially constant.

If, however, the BPT valve 31 fails and becomes unable to control the exhaust back pressure P2 constant, the EGR quantity deviates from a desired target value, and an excessive amount of the EGR gas makes the engine unstable, resulting in undesired fluctuation or variation in the engine revolution speed.

Since the BPT valve 31 controls the exhaust back pressure P2 on the downstream side of the control orifice 5 to be constant, the flow rate Qe of the EGR gas flowing through the EGR valve 11 is given by;

$$Qe \approx K \cdot A(P1-P2)^{1/2}$$

where P1 is the exhaust pressure on the upstream side of the control orifice 5, A is the opening area of the control orifice 5, K is a flow coefficient. Therefore, even if the EGR valve 11 remains normal, the failure of the BPT valve 31 causes the EGR quantity to deviate from the desired target value. If the EGR quantity is increased excessively, the combustion in the engine becomes unstable, and the engine revolution fluctuates largely.

Therefore, the control unit 7 of the EGR system according to the embodiment performs a diagnostic process to judge whether there is a malfunction of the BPT valve 31 causing an excessive increase of the EGR quantity. The control unit 7 serves as a main component of a diagnostic system.

The diagnostic process according to the embodiment of the invention is divided into the following first and second stages to improve the accuracy of the diagnosis.

First Stage

The diagnostic system monitors an effective engine rotational fluctuation parameter under a condition for performing EGR, and judges that there is a possibility of a malfunction of the BPT valve 31 causative of an excessive increase of the EGR quantity when the effective engine rotational fluctuation parameter is greater than a first judgment value. The judgement in the first stage is not final but intermediate or tentative. The diagnostic system refrains from making a final judgement in the first stage, and proceeds to the second stage.

Second Stage

The diagnostic system forcibly cuts off the EGR operation under the condition for performing the EGR, and determines the effective engine rotational fluctuation parameter in the state of EGR cutoff. The diagnostic system judges there actually exists a malfunction in the BPT valve 31 if the effective fluctuation parameter determined during the EGR cutoff is smaller than or equal to a second judgement value which is smaller than the first judgement value.

Thus, this diagnostic system checks the effective engine rotational fluctuation parameter twice, first in an EGR ON state in which the exhaust gas recirculation is performed, and secondly in an EGR OFF state in which the exhaust gas recirculation is cut off.

Figure 2:
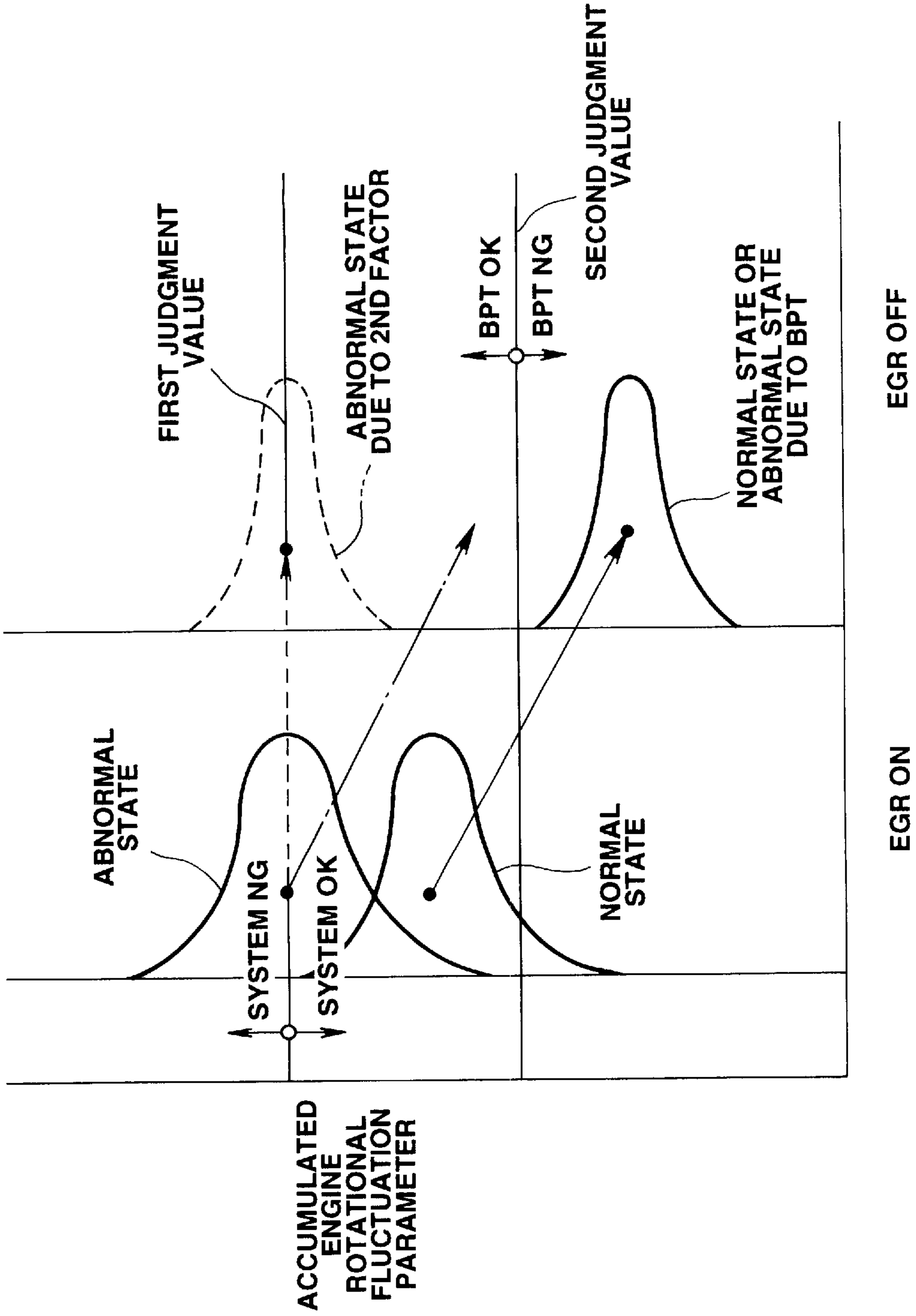
FIG. 2 is a graph for illustrating the principle of diagnosis according to the embodiment of the invention.
Figure 3:
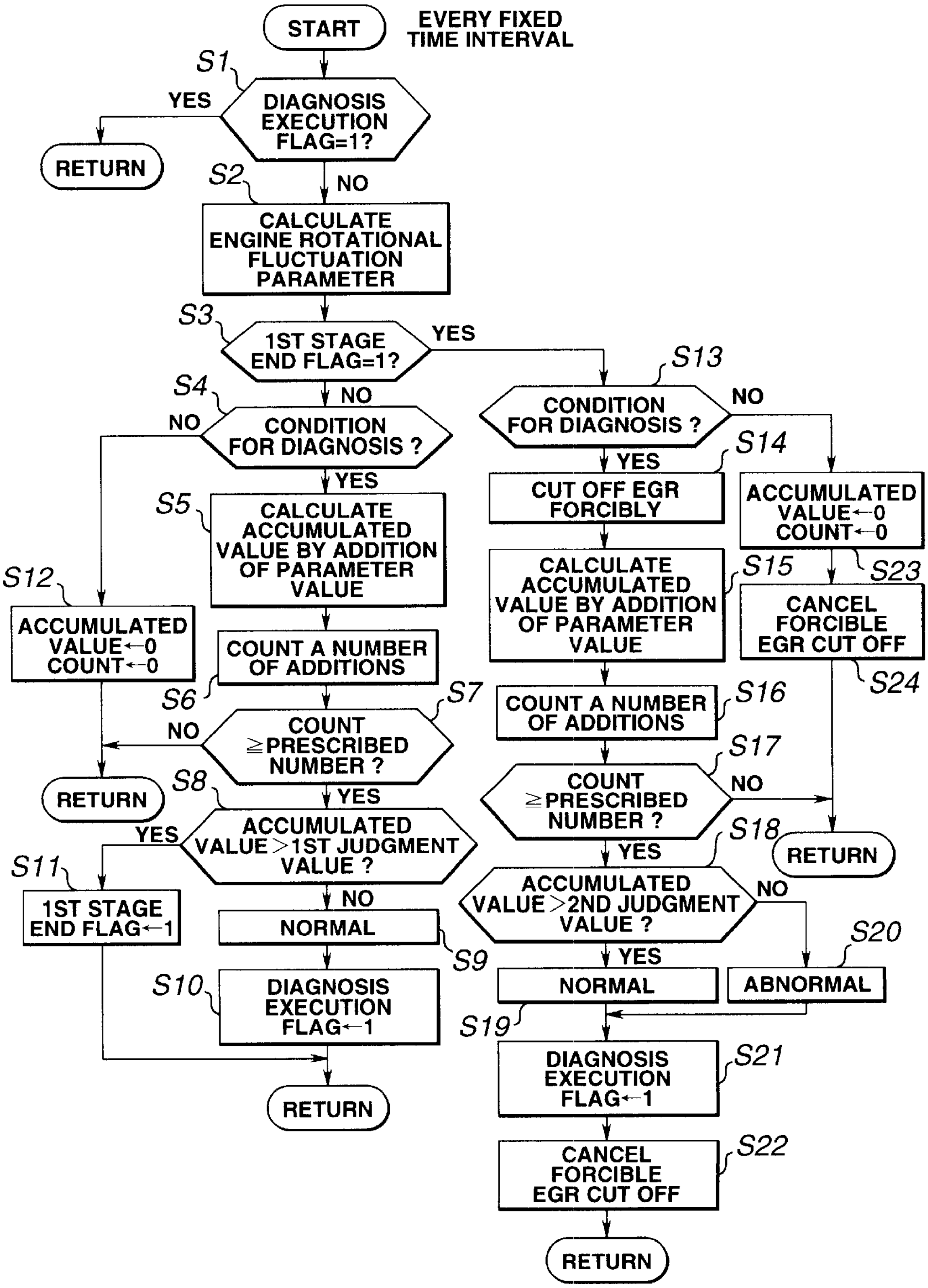
FIG. 3 is a flowchart showing a diagnostic process according to the embodiment.

In the example shown in FIGS. 2 and 3, the effective engine rotational fluctuation parameter is an accumulated parameter which is an accumulated value calculated by adding a predetermined number of values of an elemental engine rotational fluctuation parameter.

The elemental engine rotational fluctuation parameter employed in this example is a misfire parameter determined based on the fluctuation of the engine revolution. The misfire parameter may be a misfire parameter MISA or MISB disclosed in Japanese Patent Kokai Publication No. 4(1992)-113244. Alternatively, the misfire parameter used in this embodiment may be a similar misfire parameter MISC disclosed in Japanese Patent Kokai Publication No. 9(1997)-32625.

The misfire parameter is a quantity designed to detect a misfire in an engine. A measuring angular interval corresponding to a combustion stroke is determined on the periphery of a ring gear of an engine crankshaft assembly. An angle or angular position sensor (such as a ring gear sensor) confronts the ring gear and serves as means for measuring a time required for the measuring interval to pass by a predetermined measuring point. This time becomes greater in the case of misfire. The misfire parameter (MISA or MISB) is calculated in proportion to an increase in the time due to misfiring. The diagnostic system can judge that there exists a misfire when the misfire parameter is greater than a predetermined value.

In the case of nonexistence of misfire, the misfire parameter (MISA or MISB) represents the degree of fluctuation or variation of the engine revolution. The misfire parameter increases as the fluctuation of the engine revolution increases. The misfire parameter can serve as the engine rotational fluctuation parameter (or engine rpm fluctuation parameter) indicative of the degree of the fluctuation of the engine revolution or engine speed, or the degree of the roughness or instability of the combustion in the engine.

A value of the misfire parameter is determined for each ignition. However, the diagnostic judgment based on a single value of the misfire parameter for one ignition is susceptible to influence from parameter fluctuation or dispersion of measurement. Therefore, the diagnostic system of this example employs an accumulated misfire parameter (or an accumulated value of the misfire parameter) obtained by totalizing a predetermined number of values of the misfire parameter determined for each ignition. The original misfire parameter is an elemental, per-ignition parameter determined for each ignition, and the accumulated misfire parameter is equal to an accumulated value of the elemental parameter.

FIG. 2 illustrates the principle of the diagnostic process the control unit 7 performs to detect a failure in the BPT valve 31. The vertical axis in FIG. 2 expresses the accumulated engine rotational fluctuation parameter (i.e. the accumulated misfire parameter obtained by adding up a predetermined number of values of the elemental per-ignition misfire parameter). The horizontal axis expresses the frequency distribution. Normally, values of the accumulated misfire parameter are scattered as shown in FIG. 2. Although the engine rotational fluctuation parameter becomes high even when the EGR valve 11 is fixed at the open position, the following explanation presupposes the EGR valve 11 being normal.

The left half of the graph of FIG. 2 shows EGR-on-time distribution curves obtained when the EGR is being performed. The right half of the graph shows EGR-off-time distribution curves obtained when the EGR is cut off. If the BPT valve 31 has a malfunction causing an excess increase of the EGR quantity, the engine rotational fluctuation increases above normal, and hence the on-time distribution curve is shifted upwards in FIG. 2. The on-time distribution curve in an abnormal state is at a higher level than the on-time distribution curve in a normal state. In the example shown in FIG. 2, the first judgement value is set at the center of the upper distribution curve on the left half. If the accumulated engine fluctuation parameter is greater than the first judgement value, there is a possibility that the BPT valve 31 has a malfunction causative of an excessive increase of the EGR quantity.

This possibility does not necessarily mean the existence of a malfunction in the BPT valve 31. The engine rotational fluctuation may be increased by a cause other than a malfunction of the BPT valve 31. Clogging in a fuel injector can increase the engine rotational fluctuation by decreasing the fuel injection quantity to a level insufficient to achieve a desired engine torque. An error of a sensed intake air quantity measured by an air flowmeter below an actual intake air quantity can also increase the engine rotational fluctuation (by causing a decrease in the fuel injection quantity which is determined in proportion to the output of the air flowmeter).

Thus, the abnormal condition in which the engine rotational fluctuation parameter exceeds the first judgement value can be attributable to the following two different causes. By properly distinguishing one from the other, the diagnostic system according to this embodiment can detect a malfunction in the BPT valve 31 accurately.

(i) Malfunction in the BPT valve 31 causing an excessive increase in the EGR quantity.

(ii) Factor in the fuel injector or injectors, the air flowmeter or other components (which exists even when the BPT valve 31 is normal).

The engine rotational fluctuation becomes smaller when the EGR control is cut off while the BPT valve 31 and other components are working properly in a normal manner. Consequently, the distribution curve in the normal state is shifted downward as shown by a solid line arrow in FIG. 2 to a distribution curve shown by a solid line on the right half of FIG. 2. Analogously, the cutoff of the EGR control shifts the distribution curve downward as shown by a one dot chain line arrow in FIG. 2 to a lower level of the accumulated fluctuation parameter in the case of (i). In the case of (ii), the cutoff of the EGR control shifts the distribution curve horizontally as shown by a broken line arrow so that the level of the accumulated parameter remains substantially unchanged. By examining this difference in the shifting behavior of the distribution curve caused by the EGR cutoff, the diagnostic system distinguishes the causes (i) and (ii). The second judgement value (which is smaller than the first judgement value) is set at a level as shown in FIG. 2. The diagnostic system according to the embodiment attributes the increase in the accumulated fluctuation parameter during the EGR control to the cause (ii) when the accumulated fluctuation parameter during the EGR cutoff is greater than the second judgement value, and to the cause (i) when the accumulated fluctuation parameter during the EGR cutoff is equal to or smaller than the second judgement value. In this way, the diagnostic system can distinguishes the two difference cases correctly.

In FIG. 2, the upper right distribution curve of a broken line is the result of the EGR cutoff when the increase of the accumulated parameter in the EGR on state is attributable to the factor other than the BPT valve 31. The lower right distribution curve of a solid line is the result of the EGR cutoff when the system inclusive of the BPT valve 31, the fuel injector system and the air flowmeter is normal or when the increase of the accumulated fluctuation parameter is attributable to a malfunction in the BPT valve 31 and the remainder of the system is normal.

FIG. 3 shows a diagnostic process according to this embodiment of the invention. The process of FIG. 3 is executed periodically each time a predetermined time elapses.

At a step SI, the control unit 7 checks a diagnosis execution flag (which is initialized to zero at the time of engine start) to determine whether the diagnosis is finished or not. When the diagnosis is not finished yet and hence the diagnosis execution flag is equal to zero, the control unit 7 decides to start the diagnosis and proceeds to a step S2 to calculate the (elemental) engine rotational fluctuation parameter.

At a step S3 following the step S2, the control unit 7 checks a first stage end flag. When the diagnosis is not finished, the first stage end flag is zero and therefore the control unit 7 proceeds to a first stage section of steps S4~S12. The section of the steps S4~S12 corresponds to the above-mentioned first stage.

At the step S4, the control unit 7 determines whether a requirement for performing the diagnosis is satisfied or not. This requirement is the same as a requirement for performing an EGR operation. This requirement includes predetermined conditions on the engine cooling water temperature, engine load, vehicle speed and engine speed.

When the requirement for the diagnosis is satisfied, the control unit 7 proceeds to the steps S5 and S6. The control unit 7 calculates the accumulated fluctuation parameter by adding up values of the elemental fluctuation parameter at the step S5, and determines a count of adding operations. The count is the number of values of the elemental fluctuation parameter which are added up to determine the accumulated fluctuation parameter. The count corresponds to the number of ignitions. At the step S7, the control unit 7 compares the count with a prescribed number.

When the count is smaller than the prescribed number, the control unit 7 terminates the current operation cycle of the process. From the next cycle on, the control unit 7 repeats the steps S5 and S6 as long as the requirement for the diagnosis is met. When the count reaches the prescribed number, the control unit 7 proceeds to the step S8, and compares the thus-determined accumulated fluctuation parameter with the first judgement value.

When the accumulated fluctuation parameter is equal to or smaller than the first judgement value, then the control unit 7 judges, at the step S9, that the BPT valve 31 is normal, sets the diagnosis execution flag to one at the step S10, and then terminates this operation cycle. Thereafter, the diagnosis execution flag set to one prevents the control unit 7 from proceeding to the step S2 and the subsequent steps.

When, on the other hand, the accumulated fluctuation parameter is greater than the first judgement value, the control unit 7 considers that there is the possibility that the BPT valve 31 has a malfunction causing an excessive increase of the EGR quantity, and sets the first stage end flag to one at the step S11 to initiate the second stage.

After the first stage end flag is set to one, the control unit 7 proceeds from the step S3 to a second stage section of steps S13~S24. The steps S13~S17 are substantially identical to the steps S4~S7 except for the step S14.

At the step S14, the control unit 7 forcibly cuts off the EGR operation and performs the steps S15, S16 and S17 in the state of the EGR cutoff. In the EGR cutoff state, the control unit 7 calculates the accumulated engine rotational fluctuation parameter by adding up values of the elemental engine rotational fluctuation parameter, and counts the number of additions (or the number of ignitions). When the count becomes equal to or greater than the prescribed number, the control unit 7 proceeds from the step S17 to the step S18, and compares the accumulated fluctuation parameter with the second judgement value at the step S18.

When the accumulated rotational fluctuation parameter is greater than the second judgement value, the control unit 7 concludes, at the step S19, that the BPT valve 31 is normal. When the accumulated rotational fluctuation parameter is equal to or smaller than the second judgement value, the control unit 7 concludes, at the step S20, that the BPT valve 31 is abnormal and causative of the excessive increase of the EGR quantity.

At the step S21 following the step S19 or S20, the control unit 7 sets the diagnosis execution flag to one to indicate the completion of the diagnosis. Then, the control unit 7 cancels the forcible EGR cutoff at the step S22.

If the requirement for the diagnosis becomes unsatisfied in the first or second stage before the number of additions for calculating the accumulated fluctuation parameter reaches the predetermined number, the control unit 7 proceeds from the step S4 to the step S12, or from the step S13 to the step S23, and resets both the accumulated parameter and the count (this is, the number of additions) to zero at the step S12 or S23. The control unit 7 waits and defers the diagnosis until the requirement is satisfied again. At the step S24 following the step S23, the control unit 7 cancels the forcible EGR cutoff.

As shown in FIG. 1, the diagnostic control unit 7 is connected with a sensor section which comprises various input devices for collecting input information on engine operating conditions. The sensor section shown in FIG. 1 comprises a temperature sensor 81 such as an engine cooling water temperature sensor, an engine revolution sensor or angular position sensor 82, such as a crank angle sensor and/or a ring gear sensor, for sensing the revolution of the engine, an ignition switch 83 and an air flowmeter 84 for measuring the intake air quantity to the engine.

Figure 4:
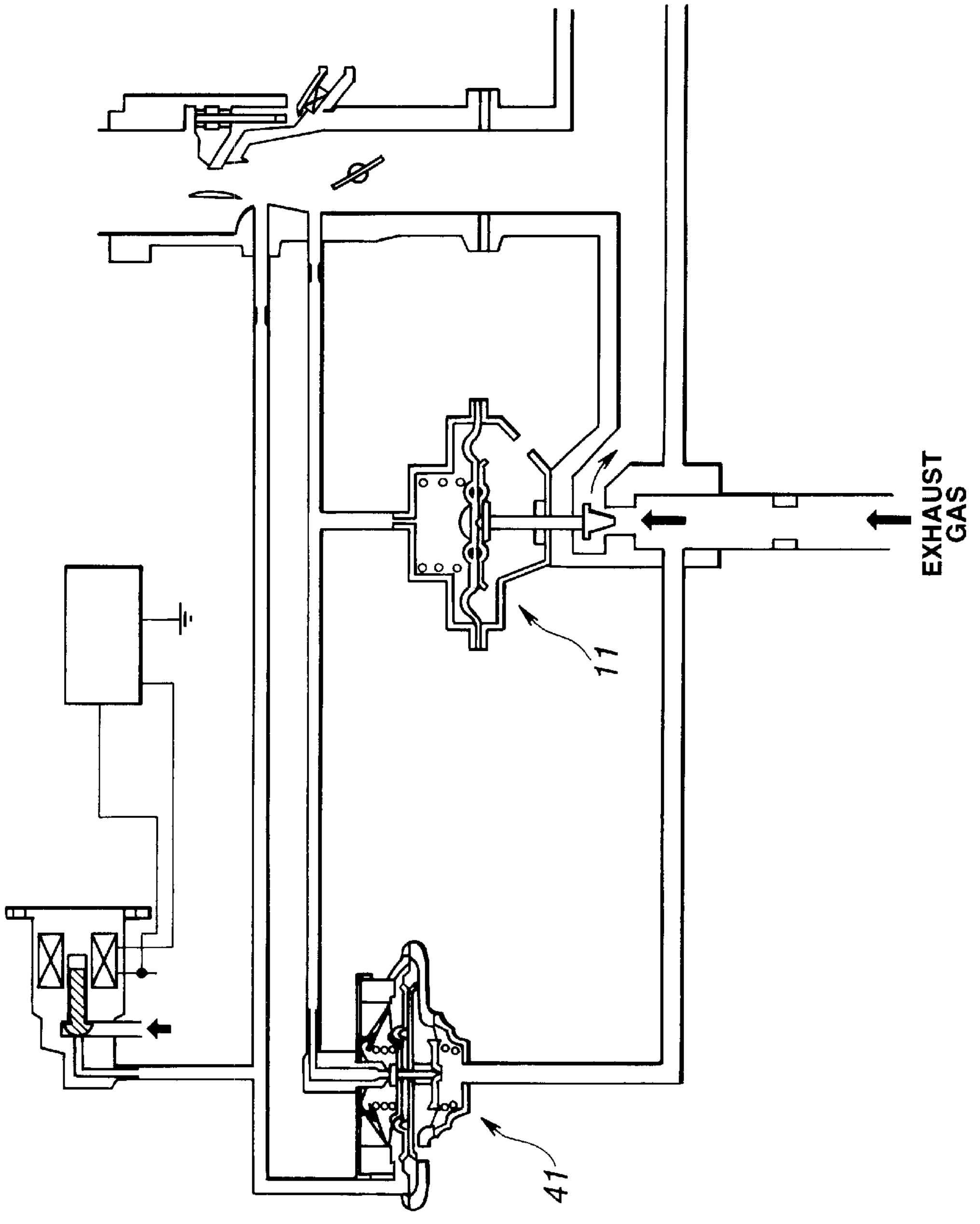
FIG. 4 is a load proportional type EGR system according to the embodiment of the present invention.

The present invention is applicable to a load proportional type EGR system. FIG. 4 shows a load proportional type EGR system according to the embodiment of the present invention. The EGR system comprises, as main components, the EGR valve 11 and the auxiliary valve for assisting the EGR valve as in the first practical example of FIG. 1. The auxiliary valve shown in FIG. 4 is a VVT valve (venturi vacuum transducer valve) 41 (second valve). The VVT valve 41 is arranged as a component of a feedback system. This EGR system utilizes the venturi vacuum as a control signal and controls the EGR quantity so that the EGR quantity is proportional to the intake air quantity. The diagnostic system can detect a malfunction in the VVT valve 41 causing an excessive increase of the EGR quantity in the same manner as in the first practical example.

In the illustrated examples, the misfire parameter is employed as the engine rotational fluctuation parameter. However, it is possible to employ, as the engine rotational fluctuation parameter, various other parameters representing the degree of engine fluctuation or the degree of the combustion roughness or instability. As to the misfire parameters and other engine rotational fluctuation parameters, explanations of the before-mentioned Japanese Patent Kokai Publications Nos. 4(1992)-113244 and 9(1997)-32625 and a U.S. Pat. No. 5,440,921 are incorporated herein by reference.

This application is based on a Japanese Patent Application No. 10-118059. The entire contents of the Japanese Patent Application No. 10-118059 with a filing date of Apr. 28, 1998 in Japan are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An EGR system comprising:

an EGR valve varying a valve opening in accordance with an intake vacuum;

an auxiliary valve assisting the EGR valve;

a first parameter calculating section calculating an engine rotational fluctuation parameter in an EGR state in which an EGR operation is performed;

a first checking section making a first decision that there is a possibility of a malfunction in the auxiliary valve causing an excess of an EGR quantity when the fluctuation parameter is greater than a first judgement value;

an EGR cutting section forcibly cutting off the EGR operation, irrespective of a condition for performing the EGR operation, when the first decision is made;

a second parameter calculating section calculating the engine rotational fluctuation parameter in an EGR cutoff state in which the EGR operation is cut off; and a second checking section making a second decision that there actually exists a malfunction in the auxiliary valve when the fluctuation parameter calculated by the second parameter calculating section is equal to or smaller than a second judgement value which is smaller than the first judgement value, wherein the first checking section compares the engine rotational fluctuation parameter calculated by the first parameter calculating section with the first judgment value, produces a normality detection signal when the engine rotational fluctuation parameter is smaller than or equal to the first judgment value and a system abnormality detection signal when the engine rotational fluctuation parameter is greater than the first judgment value; the EGR cutting section forcibly cuts off the EGR operation when the engine rotational fluctuation parameter calculated by the first parameter calculating section is greater than the first judgment value; and the second checking section compares the engine rotation fluctuation parameter calculated by the second parameter calculating section with the second judgment value, and produce a first abnormality detection signal indicating that the auxiliary valve is abnormal when the engine rotational fluctuation parameter calculated by the second parameter calculating section is equal to or smaller than the second judgment value, and a second abnormality detection signal indicating that the auxiliary value is normal when the fluctuation parameter calculated by the second parameter calculating section is greater than the second judgment value.

2. The EGR system as claimed in claim 1 wherein the auxiliary valve is one of a first valve for holding an exhaust back pressure acting on the EGR valve constant by responding to the exhaust back pressure and thereby varying a rate of dilution of the intake vacuum with atmospheric air, and a second valve for receiving a venturi vacuum as a control signal and assisting operation of the EGR valve to control an EGR gas flow through the EGR valve so that the EGR quantity is proportional to an intake air quantity.

3. The EGR system as claimed in claim 2 wherein the engine rotational fluctuation parameter is a misfire parameter.

4. The EGR system as claimed in claim 2 wherein the engine rotational fluctuation parameter is an accumulated parameter obtained by determining a value of a misfire parameter for each ignition and totalizing a predetermined number of values of the misfire parameter.

5. The EGR system as claimed in claim 1 wherein the EGR system comprises an engine revolution sensor for sensing engine rotation of the engine, and each of the first and second parameter calculating sections calculates a value of the engine rotational fluctuation parameter in accordance with a signal from the engine revolution sensor.

* * * * *